United States Patent [19]

Barrett et al.

[11] Patent Number: 4,915,416
[45] Date of Patent: Apr. 10, 1990

[54] UNDERWATER OIL PRODUCTION

[75] Inventors: Ian M. Barrett, Carshalton Beeches; Steven P. Burchell, Farnham, both of England

[73] Assignee: The British Petroleum Company p.l.c., London, England

[21] Appl. No.: 121,858

[22] Filed: Nov. 17, 1987

[30] Foreign Application Priority Data

Nov. 27, 1986 [GB] United Kingdom ................ 8628340

[51] Int. Cl.[4] .............................................. F16L 35/00
[52] U.S. Cl. ........................................ 285/18; 285/93; 285/119; 285/137.1; 285/272; 141/387; 166/359
[58] Field of Search ................ 285/272, 912, 18, 136, 285/93, 119, 137.1; 405/169, 170, 171; 166/359, 367; 441/4; 141/387

[56] References Cited

U.S. PATENT DOCUMENTS

| | | | |
|---|---|---|---|
| 1,441,157 | 1/1923 | Krenke | 285/272 X |
| 1,573,439 | 2/1926 | Bedford | 285/272 X |
| 2,299,521 | 10/1942 | Zierden | 285/272 X |
| 2,490,353 | 12/1949 | Honnay | 285/272 X |
| 4,067,202 | 1/1978 | Reed | 166/359 |
| 4,289,336 | 9/1981 | Bajeux | 285/272 X |
| 4,597,595 | 7/1986 | Wallace | 285/272 X |
| 4,639,228 | 1/1987 | Bulow | 141/387 X |
| 4,643,462 | 2/1987 | Wallace | 285/272 X |

FOREIGN PATENT DOCUMENTS 1592433 7/1981 United Kingdom .
2172371 9/1986 United Kingdom .

Primary Examiner—Dave W. Arola
Attorney, Agent, or Firm—Morgan & Finnegan

[57] ABSTRACT

A swivel-less coupling suitable for producing oil from an underwater well through a riser to a floating vessel or for transferring fluids to or from such a vessel is formed of an inner drum and a surrounding annular surface. The surface carries one or more flexible pipes which can wind and unwind helically across it to accommodate limited relative rotation as between the inner end(s) of the pipe(s) which is fixed to the drum and the outer end(s) and the pipe(s) which is fixed at a point which is rotatable relative to the drum. The pipe or pipes may be carried on cradles which can move across the surface. Relative movement as between the inner and outer ends of the pipe may be regulated by a motor, which may be controlled by sensors noting any tendency for change in the relative positions due to forces acting on the vessel.

13 Claims, 7 Drawing Sheets

UNDERWATER OIL PRODUCTION

This invention relates to a coupling suitable for producing oil from an underwater well, through a riser to a floating vessel having limited freedom of rotation (e.g. a dynamically-positioned or moored vessel).

The concept of producing oil from one or more underwater wells via a riser pipe from a sea-bed wellhead to a dynamically positioned floating vessel is now well established. It can be used in a number of situations where permanent, fixed production equipment is not available. Such situations include (a) producing from small oilfields where the cost of installing permanent production equipment would be uneconomic, (b) producing from oilfields where the water depth precludes the use of permanent production equipment, (c) extended testing of a newly-discovered oilfield to determine whether a more permanent production installation would be justified, and (d) early production from a newly-discovered oilfield while more permanent equipment is being manufactured and installed.

In all these situations there may be a need to inject gas or water for reservoir pressure maintenance into one or more wells of the reservoir and the term "producing oil" includes such necessary maintenance measures.

UK Pat. No. 2,006,758 is illustrative of the concept. A dynamically-positioned floating vessel with oil storage facilities produces oil from a wellhead assembly on the sea-bed using either a rigid riser or a flexible riser.

In an analogous system, a vessel may be loaded with oil, or may discharge oil through a buoy, with an underwater pipe leading oil to, or carrying oil away from, the buoy, In any system, whether using a rigid or a flexible riser, the deployed riser has to be protected from excessive torsional forces. The vessel has, however, to be free to swing and change heading in response to changing conditions of currents, waves or wind. It is necessary, therefore, to couple the riser to the vessel with a mechanism which allows the vessel to swing without transmitting such rotational movement to the riser. One such mechanism is a swivel coupling where the non-rotating riser fits into a portion which rotates with the vessel. Liquid tight seals are required in the coupling and these seals are likely to be subject to severe mechanical stress. To cope with these stresses, swivel couplings tend to be heavy and bulky.

To overcome the disadvantages of swivel couplings, swivel-less couplings have been proposed, where flexible pipes are wound onto or unwound from members as the vessel rotates. Such couplings are obviously particularly suitable for use with flexible risers but could also be used with rigid risers by interposing a flexible section of piping between the top of the riser and the vessel's pipework.

Such swivel-less couplings have their own problems, however. They must avoid any excessive twisting of the flexible pipes and the amount of bending at any point on the pipe must not exceed the safe minimum bending radius of the pipe. If the coupling has to allow for even a single rotation of the vessel, the length of pipe to be wound is considerable. With pipes which may be up to 10 inch diameter (0.25 m), and having minimum bending radii of several feet, this could, again, result in a bulky and heavy coupling.

The problem of bulk is compounded by the fact that there may be several individual pipe connections between the vessel and the wellhead. In addition to the main oil production riser up which the oil flows there may need to be a pipe for injecting water or artificial lift fluid into the well, a pipe for injecting a chemical into the oil and various control pipes supplying high and/or low pressure hydraulic power and electrical power to the valves and controls on the wellhead. A swivel-less coupling may have to accommodate up to at least four and, possibly, up to twenty or more flexible pipes, each capable of being wound and unwound.

The present invention is concerned with a swivel-less coupling that seeks to overcome at least some of the above-mentioned design problems.

According to the present invention a swivel-less coupling for joining a non-rotatable pipe with a pipe capable of rotating about the longitudinal axis of the non-rotatable pipe comprises an inner drum for receiving an end of the non-rotatable pipe, a surface surrounding the drum, and a helical coil of flexible pipe supported on the surface, one end of which is fixed to the inner drum and the other end of which is fixed at the outer periphery of the surface at a point which is rotatable relative to the drum.

Provided the inner end of the coil of flexible pipe is rotatable relative to its outer end, the helical coil of pipe can tighten or loosen on the supporting surface (depending on the direction of rotation) within limits set by the dimensions of the pipe and the area of the surface.

Whether the surface itself is rotatable relative to the drum is immaterial. The surface could be attached to the drum and rotate with it, the outer end of the flexible pipe being fixed at a point just beyond the outer periphery of the surface. Alternatively, the drum and surface could be separated with a gap between them so that the surface rotates relative to the drum. In a third embodiment, the surface could be split with its inner part attached to the drum and rotatable with it and with its outer part separated from the inner part and rotatable relative to it.

However, attaching all or part of the surface to the drum increases the overall weight of the drum, and it is preferred to have the surface separate from the drum and rotatable relative to it.

The dimensions of the pipe and surface should be chosen so that the minimum bending radius of the pipe is not exceeded at any point of the pipe, when the helix is at its tightest. If desired a safety factor can be incorporated so that the maximum degree of bending is, say, 1.3 to 2 times the minimum bending radius. The pipe will not, however, be subjected to any torsional forces and various commercially available flexible pipes should be adequate for the duty with lives of up to 25 years.

The length of pipe required and the area of the surface will depend on the number of rotations of the vessel which the coupling is required to withstand. Theoretically, it would be possible to accommodate several rotations and the positioning equipment on the vessel could then be relatively simple. Nevertheless, it has been established that vessels fitted with limited dynamic positioning capabilities or moderately sized stern mounted thrusters can operate with a net rotation about the riser of ±360° and to a maximum of ± one and a half revolutions. The size of surface is preferably designed for this degree of rotation, therefore, the vessel's dynamic positioning system acts to realign the vessel at or before this extent of rotation is reached. Warning devices may be fitted to indicate when the vessel is nearing its maximum allowable rotation.

The flexible pipe moves across the surface as the helix tightens or loosens. The pipe may rest directly on the surface, and, to reduce friction, the surface may be made of a low-friction material, e.g. polytetrafluorethylene. This arrangement may be adequate for small, lightweight couplings but for larger couplings, the pipe may be held in cradles positioned at regular intervals along its length, these cradles having low friction wheels or rollers contacting the surface. Such cradles would avoid any wear on the exterior of the pipe itself.

Such cradles could also be mechanically positioned in proportion to the degree of rotation, thereby reducing or eliminating any strain on the pipe.

The surface supporting the flexible pipe may be frusto-conical, with the slope going down from the inside to the outside so that gravity assists the loosening of the helix. Alternatively, the surface may be concave, going down from the outside to the inside, so that gravity assists the tightening of the helix. However, the flexible pipe may be designed to have a natural tendency to straighten, thus rendering gravity-assistance unnecessary. The surface is, in fact, preferably planar.

The greatest stress on the helical pipe is likely to be at its inner end where it is connected to the inner drum and at its outer end where it connects, at the periphery of the surface, to a take off point. The ends of the pipe may therefore meet the inner drum and its fixed point at the periphery of the surface tangentially and there may be some strengthening of the pipe at its ends, e.g. an external reinforcement sheath at each end. The inner drum and the periphery may also be recessed to accommodate the ends of the pipe. Various arrangements may be envisaged for connected the helical pipe to the inner drum and to the fixed point at the periphery of the surface. On the drum, there may be a vertical stanchion to which the riser pipe is connected, with a T-pipe (which may be rigid or flexible) leading to a connector at the outside edge of the inner drum. This stanchion may have a full-bore ball valve at the top or a removable cover which can be replaced by a pig launcher/catcher tube. This will allow cleaning of the stanchions and the riser pipe as required. Through flowline tools may also be inserted at this point as required.

To allow for cleaning of the flexible helical pipe coils of the swivel there may be a similar full-bore ball valve or other pig or tool launcher and catcher where the helical pipe is fixed at the outer periphery of the surface. At this point there may also be a quick release connector with the pipework of the vessel to allow for rapid disconnection of the swivel in an emergency (e.g. accidental over-rotation).

The inner drum may be adapted to receive the ends of a number of pipes and to house a riser head coupling with associated isolation valves and flushing systems. There may thus be a number of helical coils of pipe on the table surface, each coil connecting with a pipe of the inner drum and each going to a separate outlet on the periphery of the surface. A number of coils could be laid side by side on the surface but the required diameter of the surface will increase as the number of coils increases. In one embodiment of a multi-pipe swivel which avoids an excessive surface diameter, there may be a number of surfaces stacked one above the other each holding a single helical coil. These surfaces may be held so that they rotate together and the inner drum may extend up through the stack with a pipe connection at each surface level. Alternatively, and, preferably, in a multi-pipe swivel having cradles for supporting the pipes on the surface, the cradles may be multi-tier cradles with the pipes positioned vertically above each other in slots or other suitable retaining means. Provided there is a suitable number of cradles such an arrangement can be effective without undue sagging of the pipes between cradles.

There may be a small annular gap between the relatively rotatable parts so that there is no frictional contact between them. When the surface is rotatable relative to the drum, the outer periphery of the drum and the inner and outer peripheries of the surface may have walls to help to retain the pipes and to act as bunds to contain accidental small spillages of oil.

The surface and drum should obviously have sufficient strength to support the pipes and withstand the stresses applied but they need not be solid and could have holes or be constructed of mesh to keep the weight of the device to a minimum. Low-frictional bearings may support the drum relative to the vessel. Suitably it may be a slewing bearing or ring, the drum fitting within a well, with the bearing between the drum and the vessel.

The coupling may have sensors coupled to an alarm to prevent over-rotation in either direction. Sensors could, for example, measure the position of the helix on the surface and indicate when it is tight adjacent to the inner drum or fully deployed around the outer periphery of the surface. Alternatively, sensors could measure the extent of rotation of the fixed point from its neutral position in either direction and also detect any tendency of the inner drum to rotate. Since, as explained hereafter, the inner drum may be held stationary by a motor, such sensors to detect any excursion of the inner drum may be used to control the motor.

The coupling of the present invention could be used in any situation where a non-rotatable pipe has to be connected to a rotatable unit. Thus it may be used to couple a vessel to a buoy, for both loading from or discharge to the buoy. It is conventional to allow vessels to "weathervane" around such loading or discharging buoys and it will be appreciated that there could be the same problems of preventing the transfer of torsional forces from the moving vessel to the buoy and the pipe or pipes leading away from the buoy. It is, however, as previously explained, particularly designed to cope with the constraints and problems associated with producing oil from an underwater well via a riser to a dynamically-positioned vessel. The present invention includes a vessel having dynamic positioning means and a swivel-less coupling as previously described.

It is particularly adapted to cope with multiple pipes from the sea-floor wellhead to the vessel, using a stack of tables or a multi-tier cradle. Preferably, it is used with a flexible riser, the produced oil flowing through a helical pipe coil on a table. However, it could be used with a rigid riser, the rigid riser coming into the inner drum and the oil then flowing through a helical pipe coil. It could even be used in association with a swivel coupling for the main oil production pipe, the swivel-less coupling being used for associated control lines.

With a rigid or a flexible riser, the riser may enter the vessel via an aperture through the hull of the vessel, the coupling being then placed inboard of the ship above the aperture. With a flexible riser, the riser can be taken aboard over the side or bow of the vessel and the coupling can then be outboard of the vessel with cantilevered supports holding it onto the vessel. However, even with a flexible riser, it is preferred to bring it into the vessel through an aperture and have the coupling inboard, either below or, preferably, above deck. Such an arrangement not only makes for structural simplicity, but also helps to protect the riser from external damage.

To ensure that the inner drum has no tendency to rotate through frictional forces transmitted to it as the ship rotates, it may be positioned by a motor, e.g. a hydraulic motor which may be placed on the drum. In the preferred embodiment, the surface around the drum may be part of the vessel. It can simply be a section of deck cleared of any obstructions that would impede the coiling and uncoiling of the helical pipes. As previously stated, sensors may be used to control the motor, with a suitable computerised control system. To reduce demand on the drive system and motor and eliminate any tendency for the system to "hunt", the control system may have dead zone control and be designed to switch on the motor only after the sensors have detected a difference of some few degrees (e.g. 20°) between the normal neutral position of drum and fixed point.

Other features of the vessel may follow known practice. Thus the centre of rotation may be approximately amidships with thrusters at bow and stern to hold the vessel over the centre of rotation. Alternatively the centre of rotation may be at one end of the vessel, e.g. near the bow, with thrusters holding the vessel on station but allowing it to "weathervane".

The riser, or its constituent parts, may be carried on the ship and lowered and locked into a wellhead, or the riser, if flexible, may be kept on the sea-bed permanently connected to a wellhead, sea-bed pipeline and manifold, or riser base unit and picked up by the vessel and connected to it as required. Preferably, a flexible riser is used which is permanently connected to a wellhead or other sea-bed unit with a location buoy to allow for easy pick-up by the vessel. A crane may be positioned above the swivel with a cable or cables running down through the drum to pick up and lower the riser before and after use. The connector between the riser and the drum may be a quick release connector. A number of such types of connector are commercially available.

The riser may extend up from any collection point for oil on the the sea-bed. It may be an individual actual wellhead or a template cluster unit to which oil from one or more wells is fed, or any other collection point.

The invention is illustrated with reference to the accompanying drawings in which.

Figure 1:
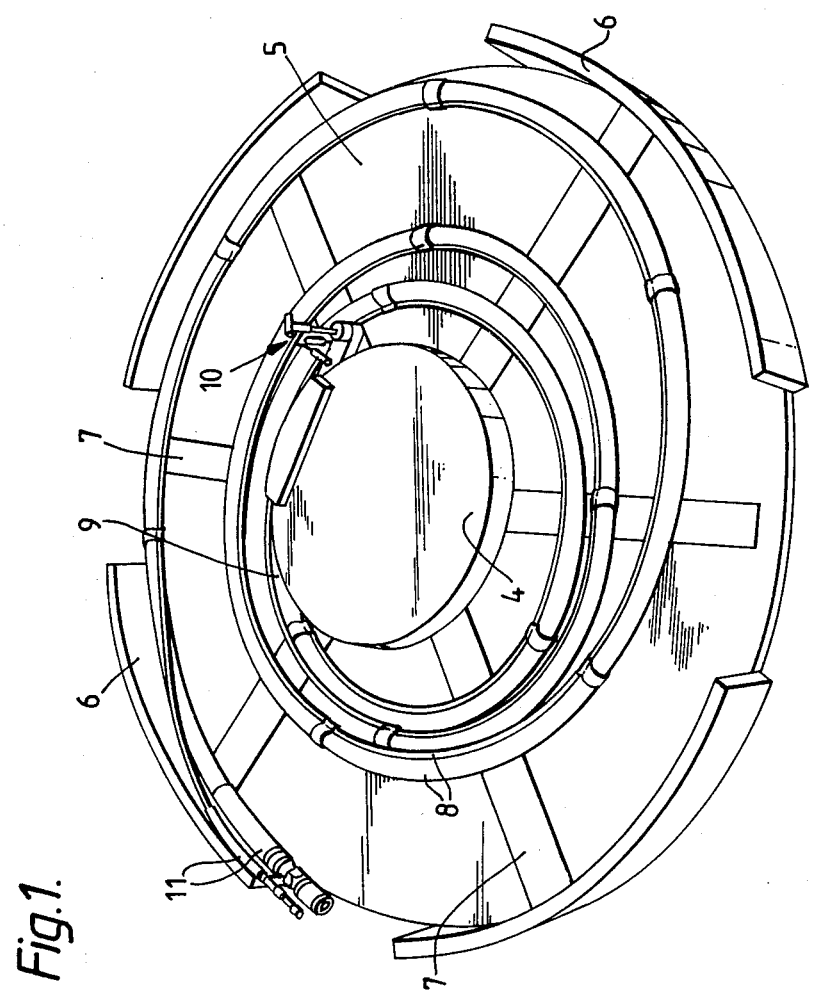
FIG. 1 is a view of a surface and drum with a helical coil of pipe on the surface in its mean position.
Figure 2:
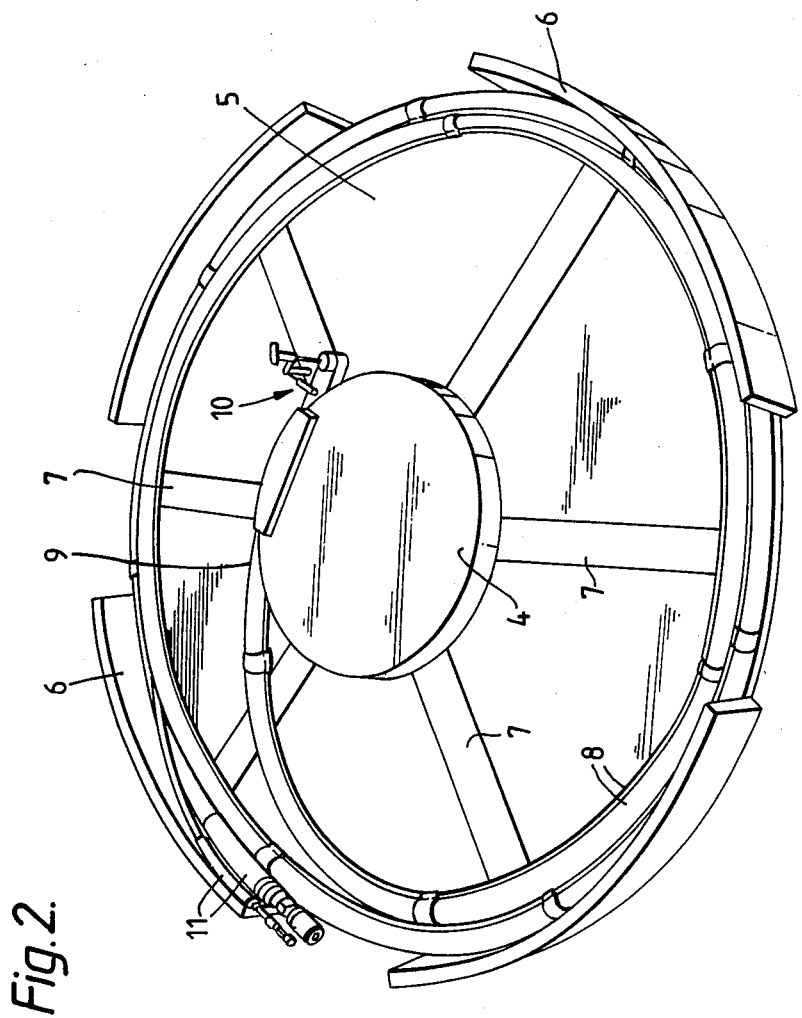
FIG. 2 is a view of the surface and drum of FIG. 1 after one full clockwise revolution of the surface with the helical pipe fully uncoiled.
Figure 3:
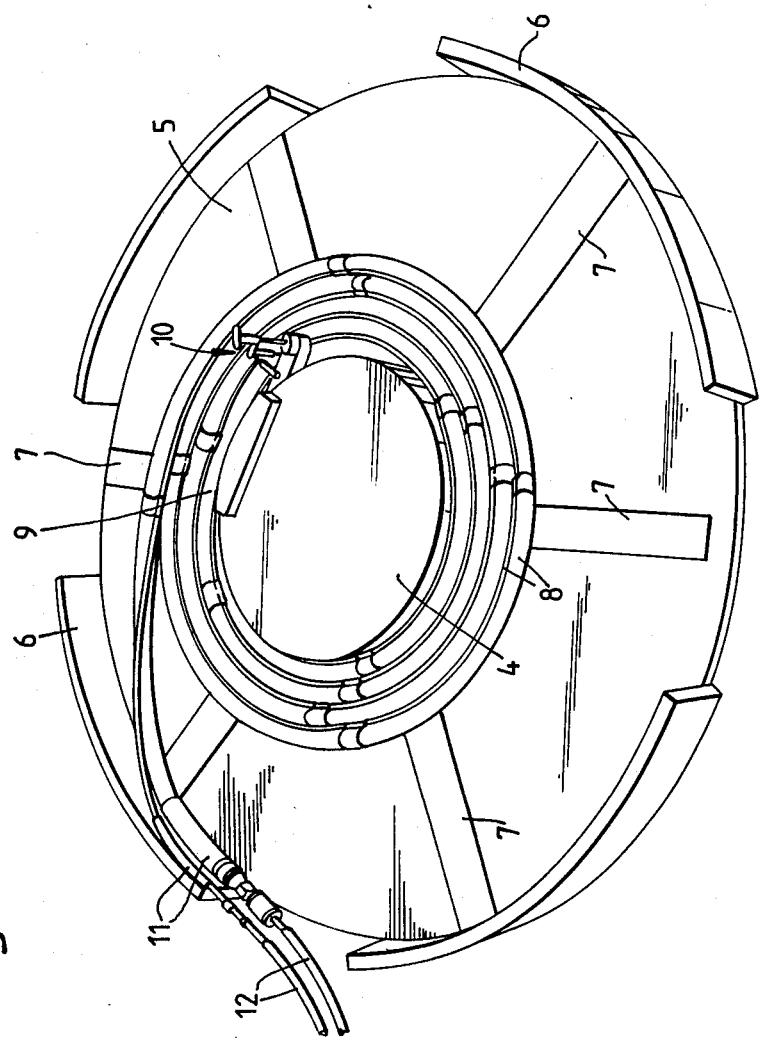
FIG. 3 is a view of the surface and drum of FIG. 1 after one full anti-clockwise revolution of the surface with the helical pipe coil at its tightest.

FIGS. 1 to 3 show a simple swivel suitable for a relatively small installation. In these figures, a swivelless coupling is formed of a fixed non-rotatable inner drum 4, with a connection beneath it (not shown) for a non-rotatable pipe. Surrounding drum 4 is an annular rotatable surface 5, with peripheral walls 6. The surface is horizontal. Radial strips 7 of polytetrafluoroethylene are fixed to the surface. On surface 5 is a helical coil of pipe 8. Two pipes one of 1 inch (25.4 mm) and the other of 3/16 inch (4.76 mm) external diameter, secured together every 12 inches to keep them together, form the coil. The inner ends 9 of the pipes are connected to inner drum 4, the approach to the drum being tangential through a clamp 10. The outer ends 11 of the pipes also approach the periphery of the surface tangentially and are connectable to take-off pipes (not shown).

In a specific model, the inner drum's external diameter was 19 inches (0.53 m), the outer drum's external diameter (as measured on the inside of peripheral walls 6) was 60 inches (1.52 m) and the pipe coil was 30 feet (9.14 m) long.

FIGS. 1 to 3 show that, with a surface, drum and flexible pipes of those dimensions and bending characteristics, two revolutions of the surface relative to the drum are possible.

Figure 4:
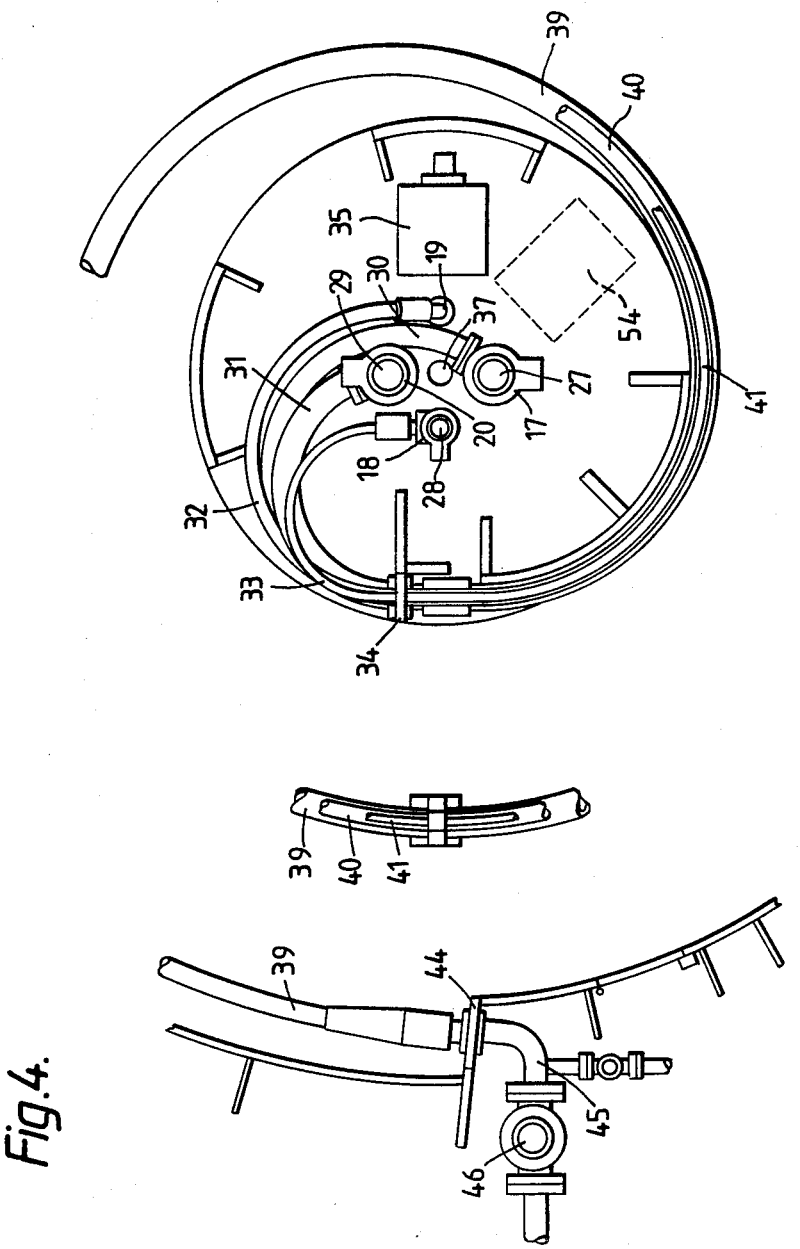
FIG. 4 is a plan view of a four-pipe swivel according to the present invention.
Figure 5:
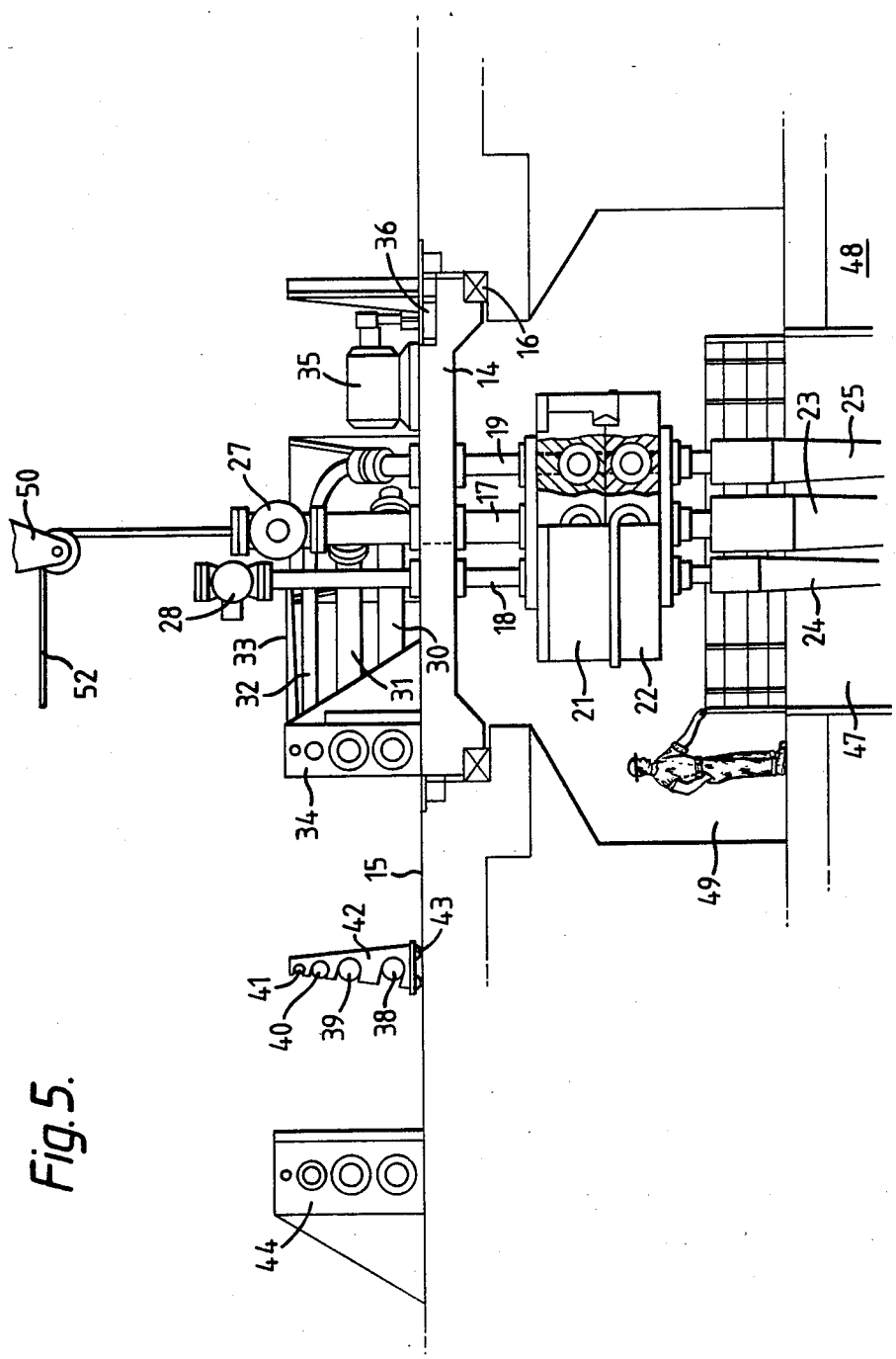
FIG. 5 is a side view of the swivel of FIG. 4.

FIGS. 4 and 5 show a larger multi-pipe swivel suitable for installation one a dynamically-positioned vessel of, say, 100,000 DWT.

In FIGS. 4 and 5, drum 14 is positioned within a well of surface 15, relative rotation between the two being allowed by low-friction slewing bearing ring 16.

On drum 14 are four vertical stanchions 17, 18, 19, 20. These stanchions extend down through the drum 14 to the top half 21 of a quick release connector. The lower half 22 of this connector forms the top of a riser tube bundle having four flexible riser pipes 23, 24, 25, 26 (pipe 26 is not in fact visible in FIG. 5 being directly behind pipe 23).

Riser pipe 23 is an 8 inch (20.3 cm) diameter oil production pipe, pipe 24 a 2 inch (5 cm) diameter gas lift pipe, pipe 25 a 4 inch (10 cm) diameter multi-bore pipe for well head hydraulic and electrical controls, and pipe 26 an 8 inch (20.3 cm) diameter water injection pipe. These four riser pipes feed through the quick release connector to stanchions 17, 18, 19 and 20 respectively. The stanchions for production oil, gas lift and water injection (17, 18 and 20) have full-bore ball valves 27, 28 and 29 at their tops to allow for tha launch and recovery of pigs and/or tools.

From stanchions 17, 18, 19, 20, pipes 30, 31, 32, 33 extend to a bracket 34 at the periphery of drum 14. Bracket 34 supports the ends of pipes 30, 31, 32, 33 vertically above each other, each pipe being tangential to the drum periphery.

Finally on drum 14 is a hydraulic motor 35 capable of moving the drum relative to surface 15 through gearing 36. Hole 37 through the centre of the drum allows a cable 52 to be passed through so that the riser pipes and connector may be raised or lowered by means of a crane positioned above the swivel. Pulley 50 for the crane is shown above drum 14.

Turning now to surface 15, the ends of drum pipes 30, 31, 32, 33 on bracket 34 are connected to the inner ends of four flexible pipes 38, 39, 40, 41. These inner ends are also tangential to the inner periphery of surface 15. Flexible pipes 38, 39, 40, 41 are also vertically above each other extending helically above surface 15 and being supported on cradles. One cradle 42 is shown with low friction casters 43 in contact with the surface 15 and with slots to hold the pipes. It will be appreciated that there will be a number of such cradles 42 on surface 15 placed to give adequate support to pipes 38, 39, 40, 41 and prevent sagging. The outer ends of pipes 38, 39, 40 41 are held in a bracket 44 which is on the outer periphery of surface 15. The periphery is stepped at this point so that the pipe ends which are tangential to the outer periphery can be connected to the main pipework 45 of the vessel. There will be four pipes verticaly above each other to connect up with flexible pipes 38, 39, 40 and 41 and they may have full-bore ball valves (one of which is shown at 46) to allow for pigging of the flexible pipes.

In FIG. 4, a hydraulic power pack, distribution and control system 54 is shown installed on the inner drum to provide actuation to the quick release connector 21 22, the full-bore ball valves 27, 28, 29, the motor 35 and subsea equipment via the riser. It is preferable to house the power pack on the drum and provide electrical power and control via an overhead cable than to install an additional multi-bore umbilical in the swivel.

Figure 6:
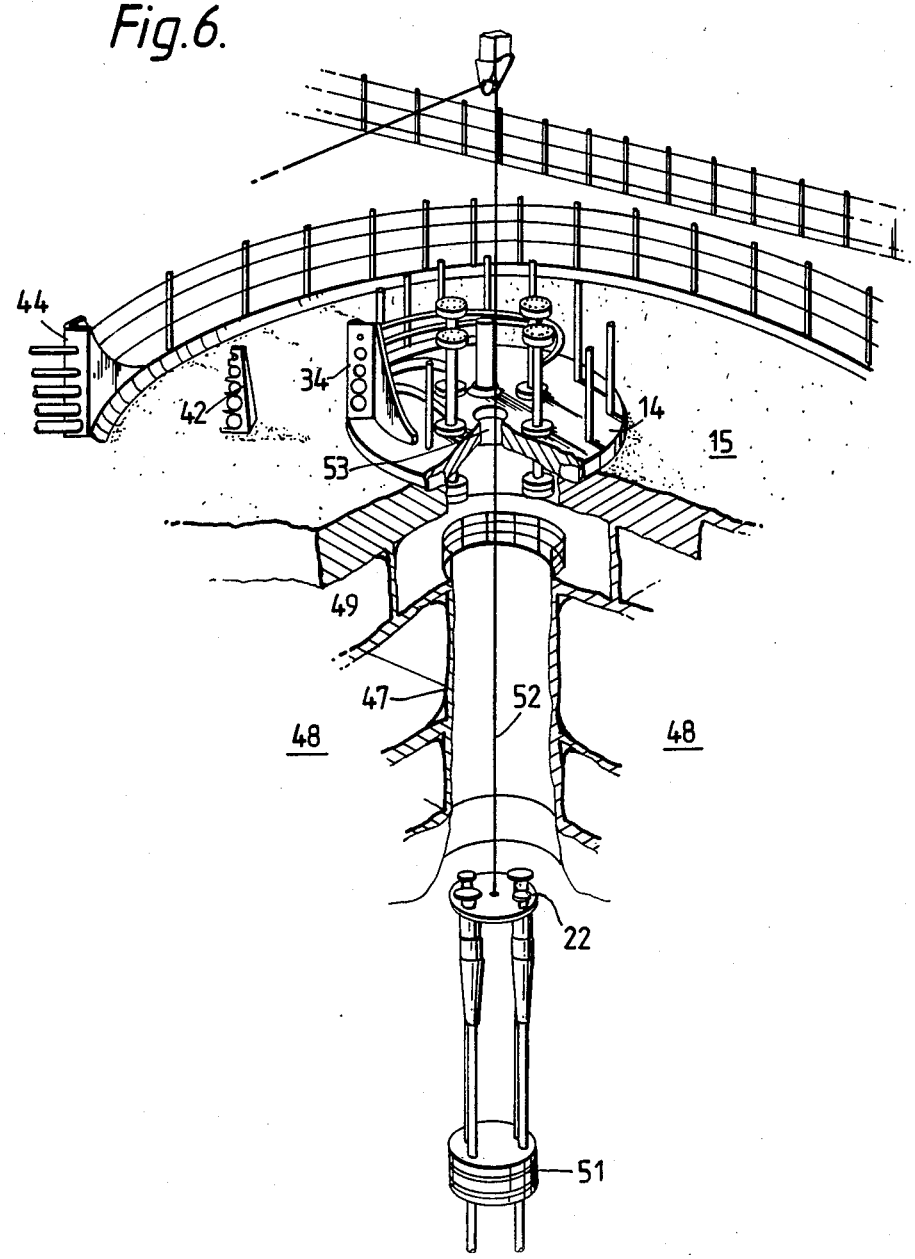
FIG. 6 is a sketch of the swivel of FIGS. 4 and 5 above an aperture in the hull of a vessel.
Figure 7:
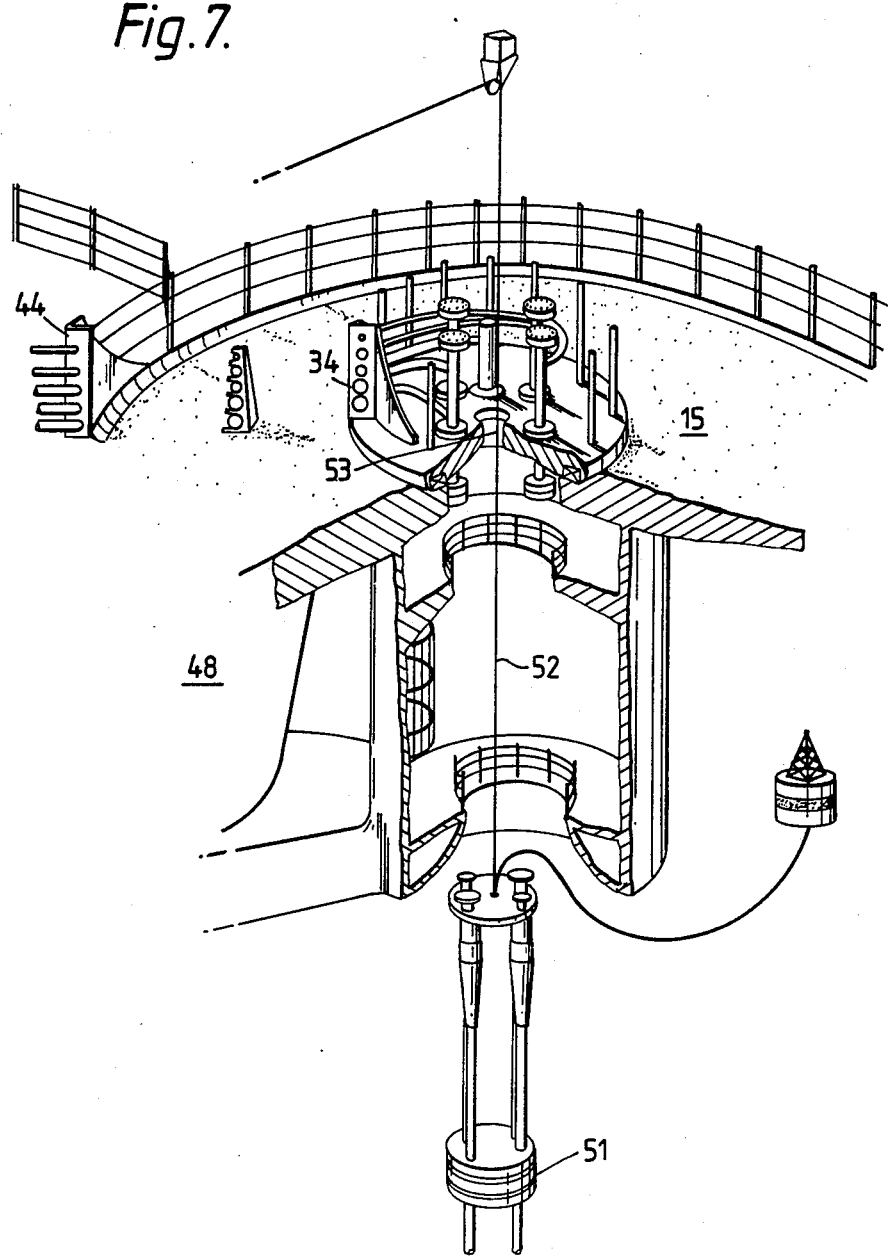
FIG. 7 is a sketch of the swivel of FIGS. 4 and 5 above a bow-mounted turret.

The riser pipe bundle may have buoyancy and other clamps to hold the individual pipes of the riser in position (see more particularly FIGS. 6 and 7).

In FIG. 5, the riser pipe bundle is shown coming up through an aperture 47 in the hull 48 of a dynamically-positioned vessel. The aperture has an inspection gallery 49.

FIGS. 6 and 7 in which the main components of the swivel have the same reference numerals as FIGS. 4 and 5 are self-explanatory showing the swivel of FIGS. 4 and 5 in position above a vessel hull aperture (FIG. 6) or on a bow-turret (FIG. 7). A buoyancy clamp 51 for the riser bundle is shown in each Figure and FIG. 7 shows a recovery buoy 53 attached to the end of the riser pipe bundle.

In operation, a vessel with dynamic positioning capability carrying a swivel of FIGS. 4 and 5 will position itself above an underwater well, pick up the lower quick release connector portion by means of the cable 52 and bring it into the aperture to mate with the upper half 21 of the quick release connector below drum 14. After suitable checking, production can commence, the riser and drum 14 being held stationary relative to surface 15 and the ship by motor 35. As the ship weathervanes, sensors detecting the relative movement between drum and ship may actuate the motor after 20° of relative movement between the drum and table to their previous relative positions. The vessel's dynamic positioning thrusters will hold the ship on station, but will not prevent weathervaning. If, however, the relative movement approaches 360°, the vessel will actuate its thrusters to rotate the ship back to its original position.

When the vessel has taken on its allowable cargo of crude oil the riser is disconnected and lowered back into the sea, the vessel being then free to transport the crude oil to a suitable discharging terminal.

The size of the swivel and particularly the outside diameter of the table will depend on the minimum bend radius of the largest pipe and the amount of required rotation. In the embodiment of FIGS. 4 and 5 with 8 inch (20.3 cm) diameter production oil and water injection pipes, the external diameter of surface 15 will be about 16 meters. This gives a total deck area requirement of above 200 sq. meters. The height, even with 4 flexible pipes, can be below 2 meters.

We claim:
1. A swivel-less coupling for joining a non-rotatable pipe with a pipe capable of rotating about the longitudinal axis of said non-rotatable pipe comprising:
    an inner drum for receiving an end of the non-rotatable pipe,
    a surface surrounding the drum and means supporting said drum relative to said surface,
    a helical coil of flexible pipe supported on said surface but capable of coiling and uncoiling across said surface,
    one end of said helical coil of flexible pipe being fixed to the inner drum and in communication with the non-rotatable pipe, and
    the other end of said helical coil of flexible pipe being in communication with the pipe capable of rotation at a point at the outer periphery of the surface, said point being capable of moving relative to the inner drum around the circumference of the surface.

2. A swivel-less coupling as claimed in claim 1 wherein the surface is rotatable relative to the drum.

3. A swivel-less coupling as claimed in claim 1 having at least two helical coils of flexible pipe in communication with at least two non-rotatable pipes of the drum.

4. A swivel-less coupling as claimed in claim 3 wherein at least two helical coils of flexible pipe are supported on cradles with the coils being supported vertically above each other on the cradles, said cradles being capable of moving over the surface to allow the helical coils to coil and uncoil.

5. A swivel-less coupling as claimed in claim 4 wherein the stanchion has means for launching and retrieving pipes.

6. A swivel-less coupling as claimed in claim 1 wherein the helical coil of flexible pipe is supported on cradles capable of moving over the surface to allow the helical coil to coil and uncoil.

7. A swivel-less coupling as claimed in claim 1 wherein the drum has a stanchion in communication with the end of the non-rotatable pipe and a pipe connected to the stanchion and extending to the outer periphery of the drum.

8. A swivel-less coupling as claimed in claim 7 wherein each stanchion has means for launching and retrieving through flow line tools.

9. A swivel-less coupling as claimed in claim 1 wherein the flexible pipe on the surface has means, at its outer ends, for launching and retrieving pigs.

10. A swivel-less coupling as claimed in claim 1 wherein the drum is rotatable relative to the point at the outer periphery of the surface by means of a motor.

11. A swivel-less coupling as claimed in claim 10 having sensors to determine the position of the drum relative to point at the outer periphery of the surface and actuate the motor as required.

12. A swivel-less coupling as claimed in claim 1 wherein the drum has a quick release connector for connection to the non-rotatable pipe.

13. A swivel-less coupling as claimed in claim 12 wherein the drum has a central hole for a cable for raising and lowering a quick release connector for the non-rotatable pipe.

* * * * *